United States Patent

Dahan et al.

Patent Number: 5,838,417
Date of Patent: Nov. 17, 1998

[54] APPARATUS AND METHOD FOR ASSEMBLING CLIP-ON EYEGLASS ACCESSORIES

[75] Inventors: Michael Dahan; Charles Dahan, both of Rockville, Md.

[73] Assignee: Custom Optical Frames, Inc., Rockville, Md.

[21] Appl. No.: 877,588

[22] Filed: Jun. 18, 1997

[51] Int. Cl.⁶ .................................................. G02C 13/00
[52] U.S. Cl. .............................................. 351/42; 351/178
[58] Field of Search ............................... 351/41, 42, 178, 351/200

[56] References Cited

FOREIGN PATENT DOCUMENTS

| 0 376 803 | 7/1990 | European Pat. Off. | 351/42 |
| 41 31 331 | 4/1993 | Germany | 351/42 |
| WO 93/13447 | 7/1993 | WIPO | 351/42 |

*Primary Examiner*—Huy Mai
*Attorney, Agent, or Firm*—Browdy and Neimark

[57] ABSTRACT

An assembly jig, and method for assembling a clip-on eyeglass accessory, such as clip-on sunglasses, which is custom-made for a pair of eyeglasses, such as prescription eyeglasses. The accessory is made from two lenses, a lower clasp attached to the edge of each lens, and a unitary upper bridge piece which further includes an elastic bridge with an upper clasp on either end. The clasps are hook-shaped to hold onto eyeglasses by the spring force of the bridge. No accessory frame is needed because the four clasps attach directly to the lens. To assemble the accessory with the bridge and lower clasps in the correct assembly positions the jig makes use of lens holders. These lens holders are the same as those on which the accessory lenses have already been shaped in outline so as to match the outline of the eyeglasses. The lens holders are mated with respective lens mounts on the jig, and the jig permits adjustment of the distance between the mounts and the angles of the mounts. The jig includes indicia to indicate the distance and angles, which the technician can set individually for each accessory according to the specifications of the eyeglasses to which the accessory is customized.

9 Claims, 3 Drawing Sheets

APPARATUS AND METHOD FOR ASSEMBLING CLIP-ON EYEGLASS ACCESSORIES

FIELD OF THE INVENTION

The present invention relates to an apparatus for use in assembling eyeglass accessories, as well as manufacturing methods, more particularly to a jig for assembly of clip-on eyeglass accessories.

REVIEW OF THE RELATED TECHNOLOGY

Clip-on accessory lenses are commonly used with eyeglasses to provide protection from bright sunlight with dark accessory lenses. Accessory lenses can also be adapted to reduce computer-screen eyestrain, to add a polarizing filter, to improve distance vision in haze, and similar uses, as well as for sunglasses.

Clip-on accessories are much less expensive than a second pair of eyeglasses, such as, for example, a pair of prescription sunglasses. They also cost less than making the eyeglass lenses from light-sensitive, variable-density materials such as PHOTOGRAY. These lenses are not only expensive but also have a limited color selection and cannot be specialized for fishing, driving, computer-screen viewing, and similar activities.

Clip-on accessories are inexpensive because the lenses need not be figured (ground) and because the frame is only partial, lacking earpieces. These accessories typically include two accessory lenses which cover the eyeglass lenses over the outside surface, a bridge joining the two lenses, and mounting devices for attaching the accessory to the eyeglasses.

Clip-on accessories which are made in standard shapes and sizes, rather than custom-fitted to the user's eyeglasses, are not satisfactory because of poor fit. The lens shape, lens size, and bridge span (between-lens distance) are all likely to differ from the underlying eyeglasses. Stocking custom lenses and mountings for each possible eyeglass is impractical.

As a result, custom-fitted accessory lenses are becoming more popular. Custom accessory lenses are typically of the same shape as the eyeglass lenses, although they may be slightly larger, much as one millimeter larger, to cover the eyeglass lens edges. The bridge span is also customized for the best fit.

One type of custom accessory employs a mounting that uses clasps hooking onto the bridge and the sides of the eyeglass lenses, with the accessory lenses connected by a bridge. The bridge is typically springy, so that the accessory lenses can be moved slightly apart. When the accessory is in place on the eyeglasses, the bridge is preferably slightly sprung outwardly such that the two clasps on each accessory lens are pressed against the eyeglasses by the bridge tension which tends to force the lenses toward one another. The accessory can be removed by springing the bridge a bit more so that the hook-like clasps clear the edges.

Such an accessory is disclosed in U.S. Pat. No. 5,123,724 issued to Salk on Jun. 23, 1992, which is entirely incorporated by reference herein. Salk's FIG. 1 shows the accessory and the eyeglasses. Salk's accessory has no frame around the lenses, only a bridge and four clasps which are mounted directly onto the edges of the accessory lenses. This mounting results in both lower cost and lighter weight as compared to accessories with a plastic or metal band encircling each lens, and it is sturdy enough for ordinary use.

Instead of hooks, Salk's clasps use friction members comprising straight pins 19 with rubbery sleeves 33. These rest against the sides of plastic eyeglass frames.

Salk describes a method for making the disclosed custom accessory from a kit with accessory lens blanks, clasps, and bridge material. Salk's method includes tracing an outline of the eyeglass lenses, forming the accessory lenses to the same shape, attaching upper and lower clasps to each lens, inserting the bridge into the upper clasps, placing the accessory lenses over the outline of the eyeglass lenses while tensioning (springing) the bridge, securing the upper clasps to the bridge, and trimming the bridge ends where they extend beyond the upper clasps.

Although Salk does not describe it, additional work is required because the bridge member is not pre-cut to length. Salk first attaches the upper clasps to the lenses and then runs an overly-long bridge member through them. The cut ends must of course be smoothed and checked for burrs after they are cut. Naturally, all this hand work requires a great deal of time—about forty minutes per accessory.

An additional drawback of Salk's method is that the cut ends of the bridge may corrode since any plating is removed by the cutting operation.

The time-consuming assembly work makes these accessories much more expensive than they need to be, in spite of the fact that all the components are inexpensive. The clasps and bridge are not costly. Moreover, the attachment of the clasps to the accessory lenses with glue and crimping is not a lengthy procedure. The problem has been that there has been no way of assembling the complete clip-on accessory quickly: that is, of rapidly aligning all the accessory parts.

In Salk's method the accessory lenses are shaped by hand. Salk assumes that the eyeglasses are already made, and even advises removing one or both eyeglass lenses from the frame (column 5, lines 51) so as to make a lens outline for fabricating the accessory lenses. Machinery exists for easily making customized accessory lenses to shape, and Salk mentions these at the top of column 6. However, Salk does not contemplate any use of such automatic machinery except for bypassing the hand-shaping of the lens outline.

SUMMARY OF THE INVENTION

Accordingly, the present invention has an object, among others, to overcome deficiencies in the prior art such as noted above.

The invention thus provides an alignment jig for rapid assembly of eyeglass accessories, and a method of using the jig. Rather than using Salk's awkward tracing of eyeglass lenses onto paper and tedious handwork, the present invention provides a device which uses the type of lens holder commonly used to hold a lens for edge grinding to shape the outline on automatic machinery.

The holder, which is semi-permanently affixed to the lens, is not removed from the lens after automatic outline shaping. Instead, the same holder (or alternatively, a similar holder special to the invention) is used to mount the accessory lens into a holder coupling on the jig. Since the holders are typically mounted at the optical center on each lens, the placement is symmetrical for the two accessory lenses. The optical center or optical axis is the point on the eyeglass lens surface where the optical axis of the eyeglass lens falls. Ideally, it is the point on the lens through which the user looks while staring straight ahead through the eyeglass lenses.

Alternatively, the holders can be mounted at some other generally central point on each lens, as long as the placement on either accessory lens is symmetrical.

Thus, when the holders are mounted in the jig of the present invention, the lenses are symmetrically mounted in the jig automatically as to their centers.

The invention provides calibrated lower clasp holders which are readily arranged in a symmetrical pattern, either through calibration markings, linkages, or some other means.

The invention also includes a unitary upper member combining the bridge and upper clasps in one piece. This simplifies the assembly process.

Both the lower clasps and the upper clasps preferably include latching holes for temporary positioning on the jig; the jig includes latching pins to fit into the holes.

BRIEF DESCRIPTION OF THE DRAWING

The above and other objects and the nature and advantages of the present invention will become more apparent from the following detailed description of preferred embodiments taken in conjunction with drawings, wherein.

DETAILED DESCRIPTION OF THE PREFERRED EMBODIMENTS

Figure 1:
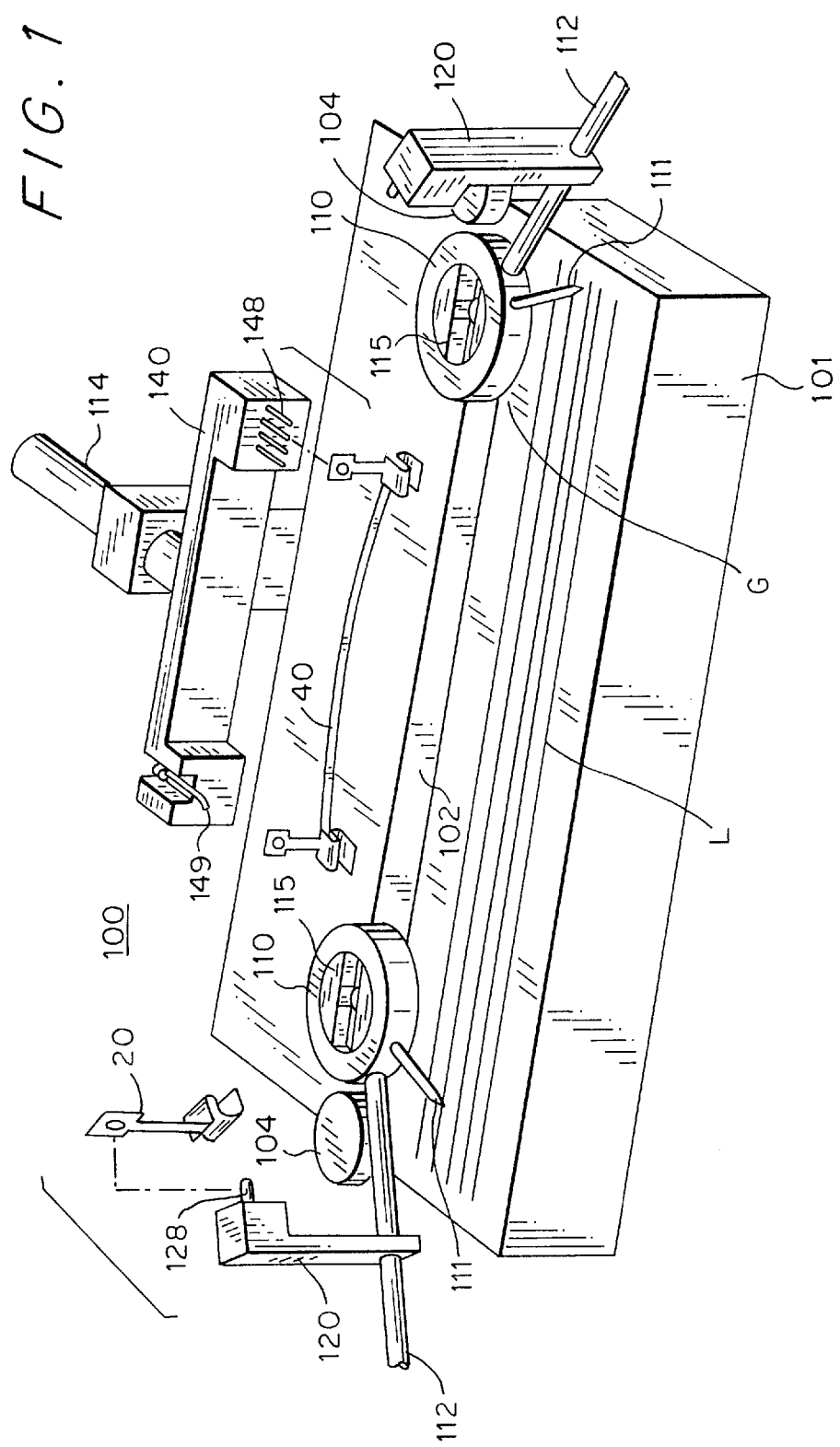
FIG. 1 is a perspective view of the jig of the present invention.
Figure 2:
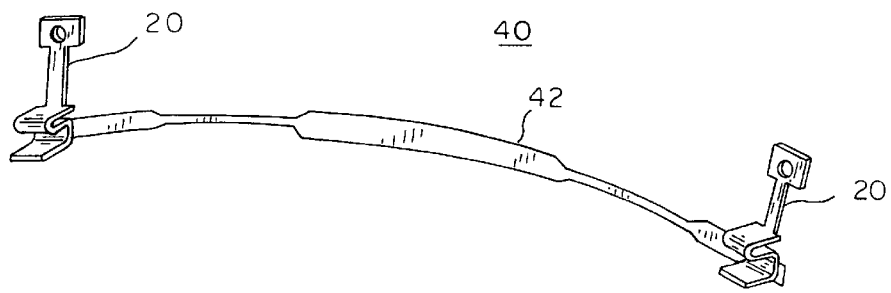
FIG. 2 is a perspective view of the unitary bridge and clasp member.
Figure 3:
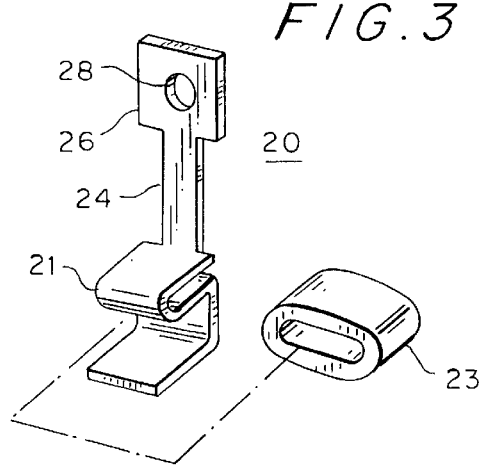
FIG. 3 is a perspective view of a clasp.
Figure 4:
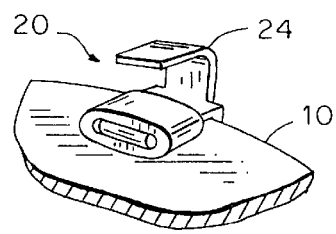
FIG. 4 is a partially broken-away perspective view of a clasp fastened onto a portion of an accessory lens.
Figure 5:
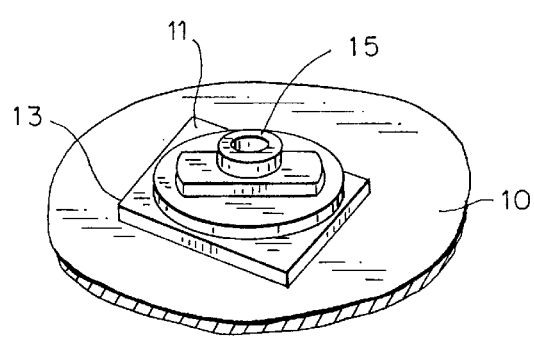
FIG. 5 is a perspective view of an accessory lens with a lens holder attached.
Figure 6:
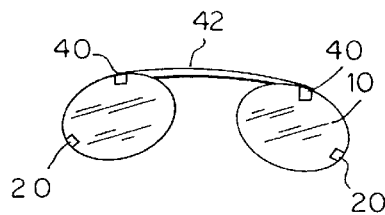
FIG. 6 shows a completed accessory.

A completed eyeglasses accessory is shown in FIG. 6. The assembly jig 100 which the present invention uses for assembling the eyeglasses accessory is shown in FIG. 1. The metal pieces of the accessory, the bridge 42 with upper clasps 42 and lower clasps 20 are shown in FIGS. 2–4. While two lower clasps 20 are illustrated, it is possible to use four. An accessory lens 10 attached to a lens holder 11 is shown in FIG. 5.

The completed accessory as shown in FIG. 6 has two accessory lenses 10, left and right, which are joined by an upper piece 40 comprising a bridge 42 and two clasps 20. The two clasps 20 are preferably constructed as a unitary construction with the bridge 42. The clasps 20 may also be constructed separately and then fixed to the bridge 42, for example by welding. The upper clasps 20 are crimped and/or glued onto the edge of the accessory lens 10 as shown in FIG. 4.

The portion 24 (FIG. 4, also shown in FIG. 2) is bent over to form a hook. These hooks engage the edges of the eyeglass lenses or the eyeglass frame (not shown; shown in FIG. 1 of the incorporated Salk patent). The bridge 42 is elastic to maintain a slight tension acting to keep the accessory hooked onto the eyeglasses, and permitting the two lenses 10 to spring apart to release the hooks from the edges for removing the accessory.

The two eyeglass accessory lenses 10 are preferably shaped by conventional machinery to the same outline as the eyeglass lenses (not shown) but preferably about a millimeter larger along the perimeter. The accessory lenses 10 may be shaped in the same machine which shapes the underlying eyeglass lenses.

As shown in FIG. 2, the upper clasps 20 are preferably just like the lower clasps 20, shown in more detail in FIG. 3, although the specific configuration of the clasps is not critical to the present invention. Each clasp 20 preferably includes a bent U-shaped portion 21, a hook portion 24 (which is straight during assembly of the accessory as explained below), and a latching portion 26 with a latching hole 28.

As shown in FIG. 4, in the final accessory the U-shaped portion is attached to the edge of the accessory lens 10, the latching portion 26 is removed, and the hook portion 24 is bent into its final hook shape. The doubled-over part of the U-shaped portion 21 is preferably covered with a sleeve 23 made of an elastomeric material, rubber, plastic, or similar high-friction and/or cushioning material.

FIG. 5 shows one lens 10 mounted on a lens holder 11. This lens holder 11 is conventional, and the drawing illustrates one conventional type. Lens holders are conventionally used to hold lens blanks in a specialized but conventional machine which shapes a lens perimeter to follow the outline of a specified eyeglass frame (not shown). The same machine and the same kind of lens holder can be used to shape the accessory (such as sunglass) lens to the same perimeter shape, although preferably slightly larger so as to cover the underlying eyeglass frame as well as the underlying eyeglass lens. Accessory lens 10 preferably is made from a blank comprising a convex plastic sheet material, which acts as a filter, polarizer, and so on, as desired for the finished accessory. Although the accessory lens is usually unfigured (zero diopter), it may also be ground to a specified prescription for special purposes. The holder 11 is attached to the convex side of the blank by any conventional means, such as by vacuum, adhesive, etc. A rubbery sheet 13 is preferably disposed between the metallic holder 11 and the lens 10.

The lens holder 11 conventionally includes a structure that defines a center point; in the illustrated type, the center point is aligned with the annular nubbin 15 (FIG. 5). Depending on the machinery and holder type, the center point may coincide with the optical axis of the eyeglass lens when the accessory lens is aligned over it, as when the finished accessory is used. In any case, the conventional machinery (or hand operation) will form each accessory lens 10 to its final shape such that the center point of the lens holder 11 is in a fixed relation to the perimeter of the accessory lens 10.

The assembly jig of the present invention makes use of the fact that the holder 11 is already centered on the lens 10. Referring to FIG. 1, the jig includes a base 101 and two lens mounts 115 which, in the preferred embodiment, are holder couplings that mate with the lens holders 11. That is, the lens 10, when inverted from the position shown in FIG. 5, can be locked into position on the lens mount 115 by fitting its attached lens holder 11 into the respective coupling. The coupling of the lens mount 115 is like that of the conventional lens shaping machine (not shown), which also mates with the lens holder 11.

It will be seen in FIG. 5 that the lens holder 11 includes a molded cross-member 16 which may be used for rotational alignment about the center point or optical axis of the lens 10. This is of course convenient in the conventional machinery since eyeglasses and accessory lenses are seldom radially symmetrical (round), and their angle in the edge-grinding machinery must be controlled.

The lens mounts 115 are preferably not rotatable. They slide along a groove 102 in the base 101 but do not turn, which keeps the accessory lenses always at the same angle during assembly. However, the device may optionally be equipped with a mechanism which permits some amount of angular adjustment of the lens mount 115. The distance of the lens mounts 115 from one another is adjustable by sliding, and they can be locked into place along the groove 102 by tightening finger screws 104. The groove 102 is preferably shaped as an inverted T, so that the lens mounts 115 cannot fall out, and the screw 104 pushes against the bottom of the groove 102 for clamping. Indicia G are are preferably marked on the base 101 to show the interocular distance of the lens held by the lens holders, preferably in millimeters (as interocular distances are conventionally measured). Preferably, the indicia is calibrated to show the same numbers on both sides. The numbers would be measured from a fixed center spot marked on each side with numbers equal to twice the distance from the center. Thus, for example, when each lens mount 115 is slid along groove 102 to a position indicated on the indicia as 100 for each mount, the interocular distance would be 100 mm.

Each lens mount 115 is surrounded by a rotatable collar 110. The collars 110 each includes a respective pointer 111 and a clasp mount slide arm 112. On the latter, a lower clasp mount 120 slides back and forth, towards and away from the lens holder 115. Each lower clasp mount 120 includes a latch or pin 128 that mates with the hole 28 in the latching portion 26 of the lower clasp 20. The pins and holes are first and second latching members.

On each of the collars 110 the pointer 111 and the clasp mount slide arm 112 make the same angle between them. Indicia, such as parallel lines L, may be inscribed on the base 101 to facilitate alignment of each collar 110 to the same angular position. When the pointers 111 of each collar 110 are each aligned to the same one of the parallel lines L marked on the base 101, their angles are complementary but equal. The coupling of the collars 110 onto the lens mounts 115 preferably includes click-stops, for example by spring-loaded balls and detents, for easily turning the collar 110 to one of its correct positions. Alternatively, a manually adjustable set screw (not shown) or other clamp may be used to fix the angular position of the collar 110 once adjusted so that the pointer 111 aligns to the desired indicia L which appears on the base 101.

The clasps 20, removably latched onto the clasp mounts 120, can be slid up to the edges of the mounted lenses 10 (not shown in FIG. 1) by sliding the mounts 120 along the slide arms 112. The clasps 20 may then be fixed onto the lenses 10 in symmetrical positions. To permit this sliding, the clasp mounts 120 are preferably friction-fitted to the slide arms 112 so that they will remain in position, but are still easily moved by hand. The preferred angular position of the collars 115 is manually determined so as to fix the lower clasps 20 to the lenses at a position which is preferably near the lower corner of the lens, i.e., the point on the perimeter of the lens where the tangent is at a 45° angle to the horizontal. This will permit the clasps to hold the accessory lenses on the underlying eyeglasses in a manner which holds the accessory in position regardless of the orientation of the underlying eyeglasses, e.g., even when upside down.

The slide arms 112 are preferably pivotably connected to the collars 110 in the vertical direction so that their unattached outboard ends can move up and down slightly so as to fit the U-shaped portion 21 of the mounted clasp 20 over the edge of the lens 10, which is held by the lens holder 11 in the lens mount 115. The slide arms 112 preferably cannot rock or pivot in any direction but up or down relative to the collar 110. The pivots of the slide arms 112 are also preferably friction-fitted to hold their adjustable positions.

The bridge piece 40 is mounted on the bridge mount 140 in a manner similar to the mounting of the clasps 20 onto the clasp mounts 120. The bridge mount 140 includes a plurality of latch pins 148 (on the right side in FIG. 1). One of the pins 148 is mated with the hole 28 in the latching portion 26 of the upper clasp 20 fixed to the bridge 40 (in the illustrated embodiment). The particular pin 148 chosen depends on the length of the bridge piece 40, whose bridge 42 may vary in length depending on the model of eyeglasses for which the accessory is being made. Thus, the illustrated embodiment is designed for use with four different bridge lengths. The longest will latch to right-most pin 142, the shortest to left-most pin 148, etc. If only one bridge 42 length is used, then only one pin 148 is needed. The number of pins 148 may thus be different on different models of the jig in order to correspond to the number of bridge lengths which are to be used.

At the end of the bridge mount 140 opposite the several pins 148 is a spring clip 149 which is inserted into the hole 28 at the other end of the bridge piece 40. The spring clip 149 moves right or left to engage the hole 28 regardless of the length of the bridge. Preferably, spring clip 149 is spring loaded to return to an equilibrium position at the left in the illustrated embodiment. This will permit the spring tension in the clip 149 to slightly spring the bridge outwardly, thus causing a small degree of spring tension from the bridge 40 to hold the accessory in position on the underlying eyeglasses when in use. Alternatively, pins 148 may be provided at each end of the bridge mount 140. Whatever design is chosen, the bridge piece 40 must be centered.

The bridge mount 140 slides along a bridge slide arm 114, preferably held in place by a friction fitting once positioned. Like the clasp mount slide arms 112, the bridge slide arm 114 preferably can pivot up and down for matching the height of the upper clasps 20 to the lens 10 edge, but cannot rotate side-to-side. This may be accomplished by pivoting that portion of the jig, in which the bridge slide arm 114 slides, relative to the remainder of the jig base 101; by pivoting the bridge mount 140 on the end of the bridge slide arm 114.

Centering is important for symmetrical placement of the upper clasps 20 of the bridge piece 40 onto the left and right accessory lenses 10, which are themselves centered on the base 101 of the jig 100 according to indicia G on the base 101. When each lens mount 115 has been slid into the proper position (each indicating the same position indicia) they are locked in place by turning the finger screws 104.

Alternatively, the lens mounts 115 can be interconnected by conventional mechanisms and linkages that will cause both to move simultaneously while maintaining symmetrical placement on either side of a fixed central spot. Analogously, the rotations of the two collars 110 can also be connected by a link or links, a crossed belt, or some other conventional means for achieving counter-rotation so that adjustment will simultaneously cause each collar 110 to be adjusted to complimentary angular positions. It is also within the scope of the invention that both sliding and rotation be inter-coupled. However, rotation is related to lens shape, and that is independent of the wearer's inter-ocular distance which determines the bridge spacing in the accessory. Thus, the distance should be set first and then the angle. This is explained in reference to an alternative mechanism shown in FIG. 7.

Figure 7:
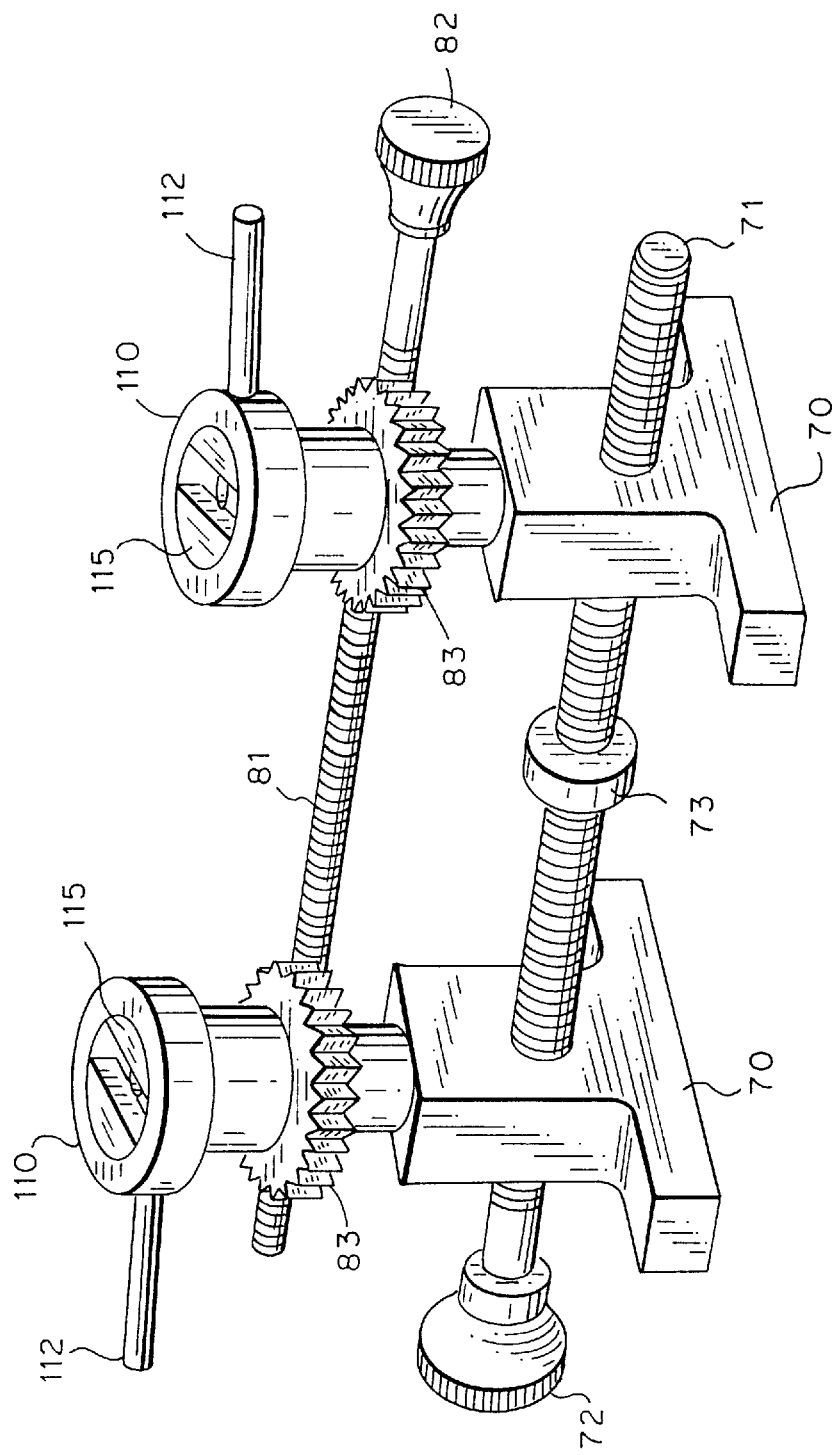
FIG. 7 is a schematic view of an alternative jig mechanism.

FIG. 7 shows a mechanism which in its position of use would be hidden within the base 101 of the jig 100. Two sliders 70 with threaded holes are screwed onto a threaded rod 71 which has two threaded portions. The holes and the threaded portions are oppositely-oriented threads (i.e., left-handed threads at one end and right-handed threads at the other) so that when the knob 72 at the end of rod 71 is turned the two sliders 70 move toward or away from each other. The rod 71 may be held in a central position by a fixed annulus 73. Clamps, and the finger screws 104 of FIG. 1, are not needed.

Each slider 70 is preferably shaped in cross-section as an inverted "T" to as to slidingly mate with the groove 102 (FIG. 1) which is similarly shaped (not shown) so that the sliders are held from falling out of the groove 102. The knob 71 is on the left or the right side of the jig 100 as it is pictured in FIG. 1.

On the other side of the jig 100 is a second knob 82 at the end of a second threaded rod 81 which, like rod 71, has oppositely-threaded portions. These portions mesh as worms with respective wheels 83. Thus, when knob 82 is turned, the wheels 83 counter-rotate. Mounted on each wheel 83 is one of the collars 110 and an associated slide arm 112. The pointers 111 are superfluous with this embodiment and are not shown in FIG. 7.

With the linkage shown in FIG. 7 the distance between the accessory lenses 10 may first be adjusted with knob 72, and then the angle of each simultaneously adjusted with knob 82, or vice versa.

The method of assembling the accessory using the jig 100 of FIG. 1 is as follows:

First, the left and right accessory lenses 10, while attached to the lens holders 11, are mounted in the respective lens mounts 115 of the jig 100. The technician should insure that the lenses are on their correct sides, and also that they are not upside down, so that the accessory lens edges will align with the eyeglass lenses with which it is interested to be used.

Using the indicia G, the technician moves each lens mount 115 along the central groove 102 to adjust the accessory lens spacing to match that of the eyeglasses. The indicia G graduations preferably show the distance between the centers of the lens mounts 115 in millimeters, so as to match the eyeglass lens inter-ocular or optical-axis distance measurement.

The lens mounts 115 are clamped in position along the groove 102 with the finger screws 104.

Next, the angle of the collars 110 must be set (and/or the angle of each accessory lens 10, if the jig 100 permits this). This is accomplished by rotating one of the collars 110 to a desired angle. The other collar 110 is then rotated to a complimentary angular position as indicated by the indicia L. The indicia L consist of lines parallel to the groove 102. The pointer 111 of the second collar 110 is set at an equal but opposite angle to that shown by the pointer 111 of the first collar 110. This occurs when the ends of the two pointers 111 point to the same line of indicia L.

A table may be provided listing the optimum angle, as set according to the indicia L of the jig 100, for each make, model, size, etc. of eyeglass frame. The table would take into account the angle differential due to springing the bridge 42 and also the correct position of the upper clasps 20 on the eyeglasses. Alternatively, as indicated above, their angle may be manually determined (by "eyeballing") so as to place the clamp near the outside lower corner of the lens, as discussed above. The difference in inter-ocular distance between the accessory lenses as assembled and as used (that is, the difference due to springing of the bridge) also may be taken into account on the table. The same table could conveniently list the proper setting for the indicia G.

The holes 28 of the lower clasps 20 are mounted on the pins 128 on either clasp mount 120.

The bridge piece 40 is mounted on the pins 148 at the right end and by spring clip 149 at the left (as seen in FIG. 1). One of the several pins 148 is selected appropriate to the length of the bridge piece 40 so that the bridge piece 40 will be centered.

With the bridge piece 40 centrally mounted on the bridge mount 140, the lower clasps 20 on the clasp mounts 120, and the accessory lenses aligned for angle and distance, the jig 100 is ready for assembling the accessory. Assembly involves inward sliding of each of the two clasps mounts 120 along their respective clasp mount slide arms 112; and of the bridge mount 140 along the bridge slide arm 114. Inward sliding and vertical adjustment brings the U-shaped portions 21 up to and onto the accessory-lens edge at the proper location as seen from above in a plan view of the jig 100.

However, as seen from the side in elevational view the U-shaped portion 21 may not meet the accessory lens 10 edge. The reason for this is that the accessory lenses 10 are likely to be edge-ground from plastic blanks which are portions of a spherical shell. The elevation of the ground edge will vary with the radial distance of the lens edge from the optical center (i.e. from center of the nubbin 15, FIG. 5).

To permit alignment, the clasp mount slide arms 112 and the bridge slide arm 114 (as described above) are pivotally mounted so that they can rock slightly in a vertical direction, permitting the U-shaped portions 21 to be vertically aligned for sliding onto the edge of the lens 10, which of course is necessary for their attachment as shown in FIG. 4. As noted, the clasp mount slide arms 112 and the bridge slide arm 114 preferably should not rock in a horizontal direction. Neither should they rotate about a horizontal axis; similarly, the clasp mount 120 and the bridge mount 140 preferably should not be able to revolve about the clasp mount slide arms 112 and the bridge slide arm 114. However, their axial sliding motions preferably should be impeded only by sufficient friction to allow them to hold their positions once moved by finger force. The friction may be provided by spring-loaded balls riding in shallow grooves, friction material, etc.

Since the accessory lenses are preferably made from spherical blanks and their edges are inclined, the U-shaped portions 21 will slide on more easily if they are inclined to the vertical. This inclination is provided by the inverted L-shape of the clasps mounts 120, which permit the lower U-shaped portion of the lower clasps 20 to swing outward past the latching portion 26, cocking the clasps 20. The bridge mount 140 preferably includes a similar geometry.

The U-shaped portions of the two lower clasps 20 and the two upper clasps 20 of the bridge piece 40 are slid over the edges of the lenses 10 in their proper positions as outlined above, and the technician fastens each U-shaped portion crimping, glue, or any other means. The accessory is then removed from the jig 100.

The final step is to clip off the four latching portions 26 and bend the straight hook portions 24 into hooks with a hook width sufficient to fit over the edges of the eyeglass frame (or lenses if the frame is absent at that location) of the eyeglasses on which the accessory is designed to fit. Preferably, the latching portions 26 are covered with a plastic or elastomer sheath prior to bending, which protects the eyeglasses and covers any rough edge left by clipping off the latching portions 26. After removal of the lens holder 11, the accessory is then complete.

It is apparent from the above description that the present invention greatly shortens the time needed for manufacturing an accessory because the alignment of the parts—lenses 10, bridge piece 40, and lower clasps 20—is quick, and the remaining operations are also rapidly completed. Therefore the present invention permits the assembly of eyeglass accessories customized for any pair of eyeglasses in a very short time, leading to reduced cost, wider availability of eyeglass accessories, and easier replacement in case of loss.

The "means for removably holding the bridge in a fixed orientation with respect to said lens mounts" is intended to encompass the illustrated bridge mount 140 and any other mechanism or device which will accomplish this function. Thus, rather than pins 148 and matching latch holes 28, the bridge 40 may be held by clips, releasable adhesive, or any other manner which will hold the bridge in place on the holder and yet permit it to be removed after being fixed to the lenses. Similarly, the "means for moving the bridge toward and away from said lens mounts" is intended to encompass the illustrated slider 114 as well as any other device or mechanism which will accomplish the specified function, including a rocking pendulum-type mechanism, a telescoping piston and cylinder-type mechanism, or any other mechanism which will permit the bridge to be moved from a position removed from the lenses to a position adjacent the lenses. While a single means may be claimed to accomplish both functions, it is intended that such language encompass separate devices, which in combination permit both functions to occur.

The "means for removably holding a clasp in a fixed but adjustable orientation with respect to one of said lens mounts" is intended to encompass not only the illustrated embodiment of clasp holder 120 but also any other device or mechanism which will permit the recited function to be accomplished, including, but not limited to, the same type of devices and mechanisms discussed above for the means for removably holding the bridge. The same is true with respect to the "means for moving the clasp along a fixed but adjustable axis toward and away from said lens mount."

The "means for adjusting the angular alignment of the axis along which the clasp moves" is intended to include not only the rotatable collar 110 of the illustrated embodiment, but any other device or mechanism for accomplishing this function. For example, the clasp holder 120 may slide in a curved groove in the base 101 or may slide along a raised curved rail. Other devices or mechanisms for accomplishing that and all of the other functions discussed herein will become apparent to those of ordinary skill in the art upon reading of the present specification.

The "means for simultaneously moving said lens mounts equal distances toward or away from a fixed central point therebetween" is intended to comprehend not only the illustrated gear mechanism of FIG. 7 but any other mechanism which will permit the specified function, such as, for example, trains of toothed wheel gears, computer-operated mechanisms which independently move the lens mounts to fixed distances from a center point, etc. The same is true for the "means for causing angular adjustment of both axes to occur simultaneously and symmetrically". Different types of gear mechanisms than that illustrated in FIG. 7 may be used as may more complicated computer-driven and remote sensor-controlled mechanisms.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention. Thus the expressions "means to . . . " and "means for . . . " as may be found in the specification above and/or in the claims below, followed by a functional statement, are intended to define and cover whatever structural, physical, chemical or electrical element or structure may now or in the future exist for carrying out the recited function, whether or not precisely equivalent to the embodiment or embodiments disclosed in the specification above; and it is intended that such expressions be given their broadest interpretation.

What is claimed is:

1. An assembly jig for assembling an eyeglass accessory including a bridge, clasps, and two eyeglass accessory lenses, the jig comprising:

a base;

two lens mounts, connected to said base, each being matable with a lens holder which is capable of holding one of the eyeglass accessory lenses;

means for adjusting the distance between said lens mounts;

means, connected to said base, for removably holding the bridge in a fixed orientation with respect to said lens mounts and for moving the bridge toward and away from said lens mounts; and a plurality of means, connected to said base, for removably holding a clasp in a fixed but adjustable orientation with respect to one of said lens mounts and for moving the clasp along a fixed but adjustable axis toward and away from said lens mount, the number of said means for holding a clasp being equal to the number of clasps in the eyeglass accessory.

2. The assembly jig according to claim 1, wherein said base includes indicia representative of the interocular distance between the lens mounts, whereby the interocular distance between the eyeglass accessory lenses held by said lens mounts when in use, as adjusted by said means for adjusting, may be read from said indicia.

3. The assembly jig according to claim 1, wherein each of said means for holding a clasp include means for adjusting the angular alignment of the axis along which the clasp moves, with respect to said lens mount.

4. The assembly jig according to claim 3, wherein said base further includes indicia representative of the angular alignment of each said means for holding a clasp.

5. The assembly jig according to claim 1, wherein said means for holding the bridge holds the bridge such that it is slightly sprung outwardly.

6. The assembly jig according to claim 3 for assembly of an eyeglass accessory having two clasps, wherein said plurality of means for holding a clasp comprises two of said means for holding a clasp.

7. The assembly jig according to claim 1, wherein said means for adjusting the distance between said lens mounts includes means for simultaneously moving said lens mounts equal distances toward or away from a fixed central point therebetween such that the distance of each lens mount from such fixed central point is always the same.

8. An assembly jig according to claim 6, wherein each of said means for adjusting the angular alignment, which is included in each of said two means for holding a clasp, are connected to means for causing the angular adjustment of both axes to occur simultaneously and symmetrically.

9. A method for assembling an eyeglass accessory including a bridge, clasps and two eyeglass accessory lenses, using an apparatus in accordance with claim 1, the method comprising:

holding each of the eyeglass accessory lenses with a lens holder matable to one of said lens mounts;

mounting each of said lens holders on a respective one of said lens mounts;

adjusting said means for adjusting the distance between said lens mounts so as to displace the lenses being held by the lens holders a distance equal to the predetermined interocular distance;

attaching the bridge to said means for holding the bridge and moving the bridge toward the lens holders until the bridge contacts the lenses;

fixing the bridge to the lenses;

attaching a clasp to each of said means for holding a clasp, adjusting the angular alignment of the axis along which the clasp moves so that the axis will intersect the edge of the lens at a predetermined position, and moving the clasp toward the lens holders until the clasp contacts the lens;

fixing the bridge to the lens; and removing the assembled eyeglass accessory from the assembly jig.

* * * * *